United States Patent Office 3,655,831
Patented Apr. 11, 1972

3,655,831
PENTAERYTHRITOL DIPHOSPHITES
Lester Friedman, Beachwood, Ohio, assignor to Weston Chemical Corporation, New York, N.Y.
No Drawing. Original application July 22, 1968, Ser. No. 746,239, now Patent No. 3,516,963, dated June 23, 1970. Divided and this application Sept. 11, 1969, Ser. No. 870,810
Int. Cl. C07d 105/04; C08f 45/58
U.S. Cl. 260—927 R                12 Claims

ABSTRACT OF THE DISCLOSURE

Compounds are prepared having the formula

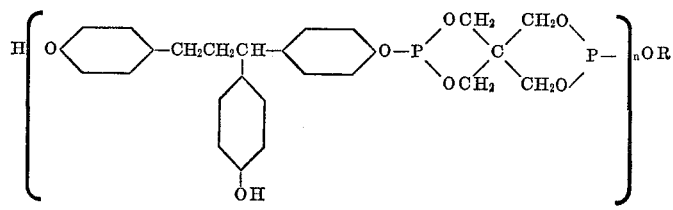

where R is alkyl, alkenyl, aryl, aralkyl, haloaryl, haloalkyl or

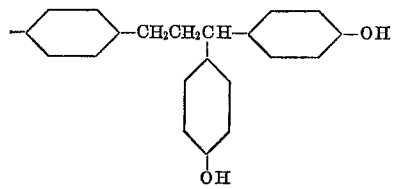

and $n$ is an integer of at least 1 and can be 100 or more. The compounds are useful as stabilizers.

---

This application is a division of my copending application, Ser. No. 746,239, filed July 22, 1968, now U.S. Pat. 3,516,963.

The present invention relates to novel phosphites.

It is an object of the present invention to prepare novel phosphites.

Another object is to develop novel stabilizers for hydrocarbon polymers, halogen containing polymers, natural and synthetic rubbers and other polymers.

A further object is to develop novel linear polymeric phosphites.

Still further objects and the entire scope of applicability of the present invention will become apparent from the detailed description given hereinafter; it should be understood, however, that the detailed description and specific examples, while indicating prefered embodiments of the invention, are given by way of illustration only, since various changes and modifications within the spirit and scope of the invention will become apparent to those skilled in the art from this detailed description.

It has now been found that these objects can be attained by preparing phosphites having the formula (1) 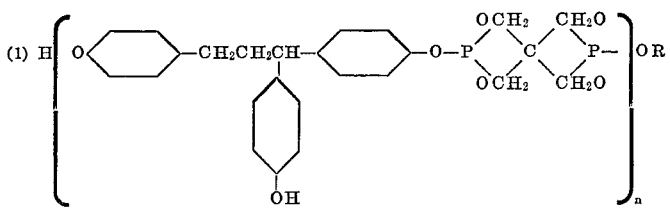

where R is alkyl, alkenyl, aryl, aralkyl, haloaryl, haloalkyl or

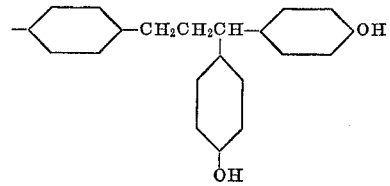

and $n$ is an integer of at least 1. $n$ can be 2, 3, 4, 5, 6, 7, 8, 10, 50, 100 or even more.

The products of the present invention within Formula 1 are prepared by reacting 1,1,3-tris (4-hydroxyphenyl) propane with a compound having the formula (2) 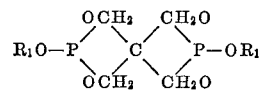

where $R_1$ is alkyl, alkenyl, aryl, aralkyl, haloaryl or haloalkyl. Typical examples of suitable starting compounds within formula (2) are diphenyl pentaerythritol diphosphite, di-p-tolyl pentaerythritol diphosphite, methyl stearyl pentaerythritol diphosphite, di-2,4-xylenyl pentaerythritol diphosphite, di-t-butylphenyl pentaerythritol diphosphite, methyl oleyl pentaerythritol diphosphite, dimethyl pentaerythritol diphosphite, diethyl pentaerythritol diphosphite, phenyl p-nonylphenyl pentaerythritol diphosphite, dihexyl pentaerythritol diphosphite, dicyclohexyl pentaerythritol diphosphite, phenyl o-dodecylphenyl pentaerythritol diphosphite, didecyl pentaerythritol diphosphite, diisodecyl pentaerythritol diphosphite, methyl eicosanyl pentaerythritol diphosphite, methyl octyl pentaerythritol diphosphite, di-2-chloroethyl pentaerythritol diphosphite, phenyl 2,4-di (nonyl) phenyl pentaerythritol diphosphite, di-2 chloropropyl pentaerythritol diphosphite, di-(4-chlorophenyl) pentaerythritol diphosphite, di-(3-chlorophenyl) pentaerythritol diphosphite, di-(2-chlorophenyl) pentaerythritol diphosphite, diallyl pentaerythritol diphosphite, di(2-decenyl) pentaerythritol diphosphite as well as the analogous materials set forth in Friedman Pats. 3,047,608 and 3,053,878, Gould Pat. 2,961,454 and Hechenbleikner Pat. 2,847,443.

The compounds of Formula 1 within the present invention are prepared by reacting 1 to 2 moles of 1,1,3-tris (4-hydroxyphenyl) propane with 1 mole of a pentaerythritol diphosphite compound having Formula 2 and removing $R_1OH$, e.g. by vacuum distillation. If 2 moles of 1,1,3-tris (4-hydroxyphenyl) propane are reacted then the product having Formula 1 is a monomer in which R is the indicated residue of the tris (hydroxyphenyl) propane. If more than 1 mole and less than 2 moles of the tris (hydroxyphenyl) propane are reacted then the product having Formula 1 is a polymer in which R is the indicated residue of the tris (hydroxyphenyl) propane and in which $n$ will depend on the ratio of the moles of the tris (hydroxyphenyl) propane to moles of pentaerythritol diphosphite. The value of $n$ will vary in the manner indicated in the following table.

TABLE 1

| $n$ | Moles of tris (hydroxyphenyl) propane | Moles of diphosphite |
|---|---|---|
| 2 | 3 | 2 |
| 3 | 4 | 3 |
| 4 | 5 | 4 |
| 5 | 6 | 5 |
| 6 | 7 | 6 |
| 7 | 8 | 7 |
| 8 | 9 | 8 |
| 10 | 11 | 10 |
| 20 | 21 | 20 |

If the ratio of tris (hydroxyphenyl) propane to the pentaerythritol diphosphite in 1:1 (or substantially 1:1) then the R group will primarily be the same as $R_1$ (although some of the material present will have only tris (hydroxyphenyl) propane end groups). The molecular weight will depend upon how much $R_1OH$ is removed in the reaction. Thus $n$ will vary as shown in the following table.

TABLE 2

| $n$ | Moles of $R_1OH$ removed per mole of tris (hydroxyphenyl) propane |
|---|---|
| 1 | 1 |
| 2 | 1.5 |
| 3 | 1.67 |
| 4 | 1.75 |
| 5 | 1.80 |
| 6 | 1.83 |
| 7 | 1.86 |
| 8 | 1.875 |
| 9 | 1.89 |
| 10 | 1.90 |
| 20 | 1.95 |
| 50 | 1.98 |
| 100 | 1.99 |

If the $R_1$ groups are different, e.g. as in methyl stearyl pentaerythritol diphosphite then the $R_1$ group from the higher boiling alcohol or phenol will be retained in the molecule while the $R_1$ group from the lower boiling alcohol or phenol will be removed.

Preferably the compounds of Formula 1 are prepared so that the mixture of compounds have an average molecular weight of 1000 to 5000, preferably 1500 to 4000.

While the above reactions, which are esterification reactions, can be carried out at atmospheric pressure or super atmospheric pressure they are preferably carried out in a vacuum, e.g. 0.1 to 100 mm. pressure, usually at 5–15 mm. pressure, at the boiling point of the monohydric alcohol or monohydric phenol which is being removed.

Unless otherwise indicated all parts and percentages are by weight.

The reactions set forth above are all preferably catalyzed with 0.1 to 5% based on the weight of the phosphite reactant or reactants of a catalyst which usually is a secondary phosphite, e.g. a dialkyl phosphite, a diaryl phosphite or a dihaloaryl phosphite or an alkaline catalyst. Examples of suitable catalysts are diphenyl phosphite, di (2-methylphenyl) phosphite, di (4-dodecylphenyl) phosphite, di (4-octadecylphenyl) phosphite, di (2 - chlorophenyl) phosphite, di (2,4 - dimethylphenyl) phosphite, di (4-bromophenyl) phosphite, diethyl phosphite, dicyclohexyl phosphite, phenyl 3-methylphenyl phosphite, dioctadecyl phosphite, dimethyl phosphite, sodium phenolate, sodium decylate, potassium p-cresylate, sodium ethylate, sodium octadecanolate, sodium hydride, sodium metal, potassium metal, lithium methylate, sodium cetylate, trimethyl benzyl ammonium hydroxide and other quaternary ammonium hydroxides, sodium hydroxide, potassium hydroxide, calcium ethylate, sodium methylate, guanadine bases, e.g. pentamethyl guanadine.

The compounds of the present invention in general are substantially colorless solids. They are useful as heat and light stabilizers and as antioxidants. They appear to be more stable than the polymers prepared in Friedman Pat. 3,053,878.

They can be readily ground for incorporation in an amount of 0.01 to 20% into various polymers such as halogen containing resins, e.g. vinyl chloride resins, as stabilizers against heat and light or as antioxidants. They are particularly useful in stabilizing rigid polyvinyl chloride resins where many other phosphites are unsuitable.

Examples of halogenated polymers which can be stabilized with the phosphites of the present invention include chlorinated polyethylene having about 14 to about 75%, e.g. 27% chlorine, polyvinyl chloride, polyvinylidene chloride, polyvinyl bromide, polyvinyl fluoride, polyvinylidene fluoride, polytetrafluoroethylene, copolymers of vinylidene chloride with acrylonitrile (e.g. 80:20) or vinyl chloride (e.g. 85:15), copolymers of vinyl chloride with 1 to 90%, preferably 1 to 40%, by weight of copolymerizable materials such as vinyl acetate, vinylidene chloride, vinylidene fluoride, diethyl fumarate, diethyl maleate and other alkyl fumarates and maleates, vinyl propionate, methyl acrylate, ethyl acrylate, butyl acrylate, 2-ethylhexyl acrylate and other alkyl acrylates, methyl methacrylate, butyl methacrylate and other methacrylates, methyl alpha chloroacrylate, styrene, vinyl ethyl ether, vinyl methyl ketone, acrylonitrile, allylidene diacetate, trichloroethylene, etc. Typical copolymers include vinyl chloride-vinyl acetate (96:4), vinyl chloride-vinyl acetate (87:13), vinyl chloride-vinyl acetate-maleic anhydride (86:13:1), vinyl chloride - vinylidene chloride (95:5), vinyl chloride - diethyl fumarate (95:5), vinyl chloride-trichloroethylene (95:5), vinyl chlorideacrylonitrile (60:40), vinyl chloride-2-ethylhexyl acrylate (80:20). They can also be used to stabilize resins where the halogen containing component is present in minor amount, e.g. acrylonitrile-vinyl chloride copolymer (85:15) or halogenated rubbers e.g. polychloroprene, chlorinated polyisobutylene, chlorinated natural rubber, chlorine containing polyurethanes, etc.

As is conventional in the art when the novel phosphites are employed with halogen containing resins there can be added barium, cadmium and zinc salts and synergistic activity is noted in this connection. Thus there can be included 0.5 to 10% of salts such as mixed barium-cadmium laurates, barium laurate, cadmium laurate, zinc stearate, cadmium 2-ethyl hexoate, barium nonylphenolate, barium octylphenolate, barium stearate, zinc octoate.

There can also be incorporated in the vinyl chloride resins and the like 0.5 to 10% of organotin compounds, particularly sulfur containing compounds such as dibutyltin bis(octylthioglycollate).

Conventional phenolic antioxidants can also be incorporated in an amount of 0.1 to 10%, e.g. 2,2-methylene bis (4-methyl-6-t-butylphenol), 2,4,6,tri-t-butylphenol, 4,4'-isopropylidenephenol, etc.

The novel phosphites of the present invention can also be incorporated in an amount of 0.01 to 20% as stabilizers for hydrocarbon polymers including monoolefin polymers such as polyethylene, polypropylene, ethylene-propylene copolymers, (e.g. 80:20, 50:50, 20:80), ethylene-propylene terpolymers, e.g. ethylene-propylenecyclooctadiene terpolymer, ethylene-butene-1 copolymer, ethylene-decene - 1 copolymer, polystyrene, polyolefin, e.g. diolefin polymers such as natural rubber, rubbery butadiene styrene copolymer (75:25, 60:40) cis isoprene polymer, polybutadiene, polisobutylene, isobutylene-butadiene copolymer (butyl rubber, e.g. 97:3, 98.5:1.5). There can also be stabilized ABS rubbers and resins (acrylonitrile-butadiene-styrene terpolymers, e.g. 50:40:10).

They can be used in an amount of 0.01 to 20% to stabilize polyurethanes (e.g. from toluene diisocyanate and polypropylene glycol molecular weight 2025), polyesters, e.g. Dacron (polyethylene terphthalate), polymeric tetramethylene terephthalate-isophthalate-sebacate, or unsaturated polyesters, e.g. ethylene glycol-propylene glycol adipate-maleate molecular weight 5000 and the corresponding polymer modified with 10% styrene, nylon, e.g. polyhexamethylene adipamide, Delrin (polymerized oxymethylene) and Celcon (oxymethylene copolymer), polyvinyl butyral, polysulfones from conjugated diolefins, sulfur dioxide and a monoethylenically unsaturated compound, e.g. a terpolymer of butadiene, sulfur dioxide and styrene as set forth in Example 1 of Mostert Pat. 3,377,324, polycarbonates, e.g. the reaction product of bisphenol A with phosgene or diphenyl carbonate as well as other polycarbonates set forth in Fritz Pat. 3,305,520.

When incorporated in hydrocarbon polymers it is frequently advantageous to add conventional phenolic antioxidants as set forth above and conventional additives such as dilauryl thiodipropionate.

They are also useful as stabilizers for foods, oils, lubricants, and other products which deteriorate on oxidation.

The compounds of the invention are also useful as flame and fire proofing additives in polyurethane, hydrocarbon polymers, cellulose esters and ethers, e.g. cellulose acetate, methyl cellulose, ethyl cellulose, cellulose acetate-propionate, etc.

The field of greatset utility at the moment, however, appears to be as stabilizers for rigid vinyl chloride resins. The rigid polyvinyl chloride resins normally do not contain over 10% plasticizer and can be completely devoid of plasticizer.

EXAMPLE 1

2 moles (640 grams) of 1,1,3-tris (4-hydroxyphenyl) propane, 1 mole (186 grams) of diphenyl pentaerythritol diphosphite and 6 grams of diphenyl phosphite (catalyst) were mixed and subjected to vacuum distillation at 10 mm. and a temperature up to 200° C. There were removed 188 grams (2 moles) of phenol to produce bis (1,1,3-tris (4-hydroxyphenyl) propane) pentaerythritol diphosphite as a substantially colorless solid.

EXAMPLE 2

2 moles of 1,1,3-tris (4-hydroxyphenyl) propane, 1 mole of dimethyl pentaerythritol diphosphite and 5 grams of sodium methylate (catalyst) were mixed and subjected to vacuum distillation at 10 mm. and a temperature up to 190 C. There were removed 2 moles of methyl alcohol to produce the same product as in Example 1.

EXAMPLE 3

1 mole of 1,1,3-tris (4-hydroxyphenyl) propane, 1 mole of dimethyl pentaerythritol diphosphite and 4 grams of sodium methylate were mixed and subjected to vacuum distillation until 1 mole (32 grams) of methyl alcohol were removed. The product in the pot was 1,1,3-tris (4-hydroxyphenyl) propane methyl pentaerythritol diphosphite. (The product of Formula 1 where R is methyl and $n$ is 1.)

EXAMPLE 4

The procedure of Example 3 was repeated replacing the dimethyl pentaerythritol diphosphite by 1 mole of diphenyl pentaerythritol diphosphite and replacing the sodium methylate by 7 grams of sodium phenolate. There was removed 1 mole of phenol by the vacuum ristillation at 10 mm. The product in the pot was 1,1,3-tris (4-hydroxyphenyl) propane phenyl pentaerythritol diphosphite.

EXAMPLE 5

The procedure of Example 4 was repeated replacing the diphenyl pentaerythritol diphosphite by 1 mole of phenyl p-nonylphenyl pentaerythritol diphosphite. There was removed 1 mole of phenol by vacuum distillation at 10 mm. The solid product in the pot was 1,1,3-tris (4-hydroxyphenyl) propane p-nonylphenyl pentaerythritol diphosphite.

EXAMPLE 6

The procedure of Example 3 was repeated relacing the dimethyl pentaerythritol diphosphite by 1 mole of methyl stearyl pentaerythritol diphosphite. There was removed 1 mole of methyl alcohol by vacuum distillation down to 100 mm. The solid residue was 1,1,3-tris (4-hydroxyphenyl) propane stearyl pentaerythritol diphosphite.

EXAMPLE 7

The procedure of Example 3 was repeated replacing the dimethyl pentaerythritol diphosphite by methyl oleyl pentaerythritol diphosphite. There was removed 1 mole of methyl alcohol by vacuum distillation down to 10 mm. The solid residue was 1,1,3,-tris (4-hydroxyphenyl) propane oleyl pentaerythritol diphosphite.

EXAMPLE 8

1.5 moles of 1,1,3-tris (4-hydroxyphenyl) propane, 1 mole of diphenyl pentaerythritol diphosphite and 6.5 grams of diphenyl phosphite were subjected to vacuum distillation at 10 mm. until 2 moles of phenol were removed. The colorless solid residue in the pot was tris (1,1,3-tris (4-hydroxyphenyl) propane) di (pentaerythritol diphosphite). (The product of Formula 1 were R is the 1,1,3-tris (4-hydroxyphenyl) propane residue and $n$ is 2.)

EXAMPLE 9

2 moles of 1,1,3-tris (4-hydroxyphenyl) propane, 1.5 moles of dimethyl pentaerythritol diphosphite and 6 grams of sodium methylate were subjected to vacuum distillation down to 10 mm. until 3 moles of methyl alcohol were removed. The colorless solid residue in the pot was tetra (1,1,3-tris (4-hydroxyphenyl) propane) tri (pentaerythritol diphosphite).

EXAMPLE 10

2.5 moles of 1,1,3-tris (4-hydroxyphenyl) propane, 2 moles of diphenyl pentaerythritol diphosphite and 11 grams of diphenyl phosphite were vacuum distilled at 10 mm. until 4 moles of phenol were removed. The colorless solid residue in the pot was penta (1,1,3-tris (4-hydroxyphenyl) propane) tetra (pentaerythritol diphosphite).

EXAMPLE 11

1.5 moles of 1,1,3-tris (4-hydroxyphenyl) propane, 1.25 moles of diphenyl pentaerythritol diphosphite and 7 grams of diphenyl phosphite were vacuum distilled at 10 mm. until 2.5 moles of phenol were removed. The solid residue in the pot was hexa (1,1,3-tris (4-hydroxyphenyl) propane) penta (pentaerythritol diphosphite).

EXAMPLE 12

2.25 moles of 1,1,3-tris (4-hydroxyphenyl) propane, 2 moles of diphenyl pentaerythritol diphosphite and 10 grams of sodium phenolate were vacuum distilled at 10 mm. until 4 moles of phenol were removed. The solid residue in the pot was nona (1,1,3-tris (4-hydroxyphenyl) propane) octa (pentaerythritol diphosphite).

EXAMPLE 13

1 mole of 1,1,3-tris (4-hydroxyphenyl) propane, 1 mole of diphenyl pentaerythritol diphosphite and 8 grams of diphenyl phosphite were vacuum distilled at 10 mm. until 1.5 moles of phenol were removed. The colorless solid residue in the pot was phenyl bis (1,1,3-tris (4-hydroxyphenyl) propane pentaerythritol diphosphite). (The product of Formula 1 where R is phenyl and $n$ is 2.)

EXAMPLE 14

Example 13 was repeated but the distillation was continued until 1.67 moles (156.7 grams) of phenol were removed. The solid residue in the pot was phenyl tris (1,1,3-tris (4-hydroxyphenyl) propane pentaerythritol diphosphite).

EXAMPLE 15

Example 13 was repeated but the distillation was continued until 1.75 moles of phenol were removed. The solid residue in the pot was phenyl tetra (1,1,3-tris (4-hydroxyphenyl) propane pentaerythritol diphosphite).

EXAMPLE 16

Example 13 was repeated but the distillation was continued until the 1.875 moles of phenol were removed. The substantially colorless solid residue in the pot was phenyl octa (1,1,3-tris (4-hydroxyphenyl) propane pentaerythritol diphosphite).

EXAMPLE 17

Example 13 was repeated but the distillation was continued until about 1.95 moles of phenol were removed. The substantially colorless solid residue in the pot was a polymer of Formula 1 where $n$ was about 20 and R was phenyl.

EXAMPLE 18

1 mole of 1,1,3-tris (4-hydroxyphenyl) propane, 1 mole of dimethyl pentaerythritol diphosphite and 7 grams of sodium methylate were vacuum distilled at 10 mm. until 1.80 moles of methyl alcohol were removed. The solid residue in the pot was methyl penta (1,1,3-tris (4-hydroxyphenyl) propane pentaerythritol diphosphite).

EXAMPLE 19

1 mole of 1,1,3-tris (4-hydroxyphenyl) propane, 0.67 mole of dimethyl pentaerythritol diphosphite, 0.33 mole of methyl stearyl pentaerythritol diphosphite and 10 grams of distearyl phosphite were vacuum distilled at 10 mm. until 1.67 moles of methyl alcohol were removed. The solid residue in the pot was stearyl tris (1,1,3-tris (4-hydroxyphenyl) propane pentaerythritol diphosphite).

EXAMPLE 20

1 mole of 1,1,3-tris (4-hydroxyphenyl) propane, 0.75 mole of dimethyl pentaerythritol diphosphite, 0.25 mole of methyl oleyl pentaerythritol diphosphite and 8 grams of sodium methylate were vacuum distilled at 10 mm. until 1.75 moles of methyl alcohol were removed. The solid tetra (1,1,3-tris (4-hydroxyphenyl) propane pentaerythritol diphosphite).

EXAMPLE 21

1 mole of 1,1,3-tris (4-hydroxyphenyl) propane, 0.75 mole of diphenyl pentaerythritol diphosphite, 0.25 mole of phenyl p-nonylphenyl pentaerythritol diphosphite and 10 grams of di p-nonylphenyl phosphite were vacuum distilled at 10 mm. until 1.75 moles of phenol were removed. The solid residue in the pot was p-nonylphenyl tetra (1,1,3 - tris (4 - hydroxyphenyl) propane pentaerythritol diphosphite).

EXAMPLE 22

1 part of bis (1,1,3-tris (4-hydroxyphenyl) propane) pentaerythritol diphosphite and 2 parts of calcium stearate were milled into 100 parts of rigid polyvinyl chloride on a two roll mill for 10 minutes at 350° F. to produce a stabilized vinyl chloride resin.

EXAMPLE 23

The procedure of Example 22 was repeated replacing the diphosphite by 1 part of 1,1,3-tris (4-hydroxyphenyl) propane phenyl pentaerythritol diphosphite to produce a stabilized polyvinyl chloride.

EXAMPLE 24

The procedure of Example 22 was repeated replacing the diphosphite by 1 part of 1,1,3-tris (4-hydroxyphenyl) propane stearyl pentaerythritol diphosphite to produce a stabilized polyvinyl chloride.

EXAMPLE 25

The procedure of Example 22 was repeated replacing the diphosphite by 1 part of 1,1,3-tris (4-hydroxyphenyl) propane p-nonylphenyl pentaerythritol diphosphite to produce a stabilized polyvinyl chloride.

EXAMPLE 26

The procedure of Example 22 was repeated replacing the diphosphite by 1 part of 1,1,3-tris (4-hydroxyphenyl) propane oleyl pentaerythritol diphosphite to produce a stabilized polyvinyl chloride.

EXAMPLE 27

The procedure of Example 22 was repeated replacing the diphosphite by 1 part of tris (1,1,3-tris (4-hydroxyphenyl) propane) di (pentaerythritol diphosphite) to produce a stabilized polyvinyl chloride.

EXAMPLE 28

The procedure of Example 22 was repeated replacing the diphosphite by 1 part of tetra (1,1,3-tris (4-hydroxyphenyl) propane tri (pentaerythritol diphosphite) to produce a stabilized polyvinyl chloride.

EXAMPLE 29

The procedure of Example 22 was repeated replacing the diphosphite by 1 part of phenyl bis (1,1,3-tris (4-hydroxyphenyl) propane pentaerythritol diphosphite) to produce a stabilized polyvinyl chloride.

EXAMPLE 30

The procedure of Example 22 was repeated replacing the diphosphite by 1 part of stearyl tris (1,1,3-tris (4-hydroxyphenyl) propane pentaerythritol diphosphite) to produce a stabilized polyvinyl chloride.

EXAMPLE 31

The procedure of Example 22 was repeated replacing the diphosphite by 1 part of p-nonylphenyl tetra (1,1,3-tris (4-hydroxyphenyl) propane pentaerythritol diphosphite) to produce a stabilized polyvinyl chloride.

EXAMPLE 32

1 part of oleyl tris (1,1,3-tris (4-hydroxyphenyl) propane pentaerythritol diphosphite) and 2 parts of calcium stearate were milled into 100 parts of polyvinyl chloride and 50 parts of dioctyl phthalate to give a stabilized vinyl chloride polymer.

EXAMPLE 33

2 parts of tris (1,1,3-tris (4-hydroxyphenyl) propane) di (pentaerythritol diphosphite) were mixed with 100 parts of solid polypropylene (melt index 0.8) to increase the oxidative stability of the polypropylene.

EXAMPLE 34

0.1 part of stearyl tris (1,1,3-tris (4-hydroxyphenyl) propane pentaerythritol diphosphite), 0.3 part of dioleyl thiodipropionate and 0.3 part of 4,4'-methylene bis (3-methyl-6-t-butylphenol) were added to 100 parts of solid polypropylene (melt index 0.8) to improve its oxidative resistance.

EXAMPLE 35

The procedure of Example 34 was repeated but the phosphite employed was 0.15 part of p-nonylphenyl 1,1,3-tris (4-hydroxyphenyl) propane pentaerythritol diphosphite to improve the oxidative resistance of the polypropylene.

EXAMPLE 36

0.5 part of tris (1,1,3-tris (4-hydroxyphenyl) propane) di (pentaerythritol diphosphite) and 0.5 part of 4,4'-thiobis (2-methyl-6-t-butylphenol) were milled into 100 parts of SBR rubber (60% butadiene-40% styrene) to give a stabilized product.

While the phosphites of the present invention are effective stabilizers for both vinyl chloride resins and hydrocarbon polymers many known phosphites which are stabilizers for vinyl chloride resins are relatively ineffective with hydrocarbon polymers, e.g. tris decyl phosphite and diphenyl decyl phosphite are not good stabilizers for hydrocarbon polymers. Unpredictability of stabilizer activity for phosphites is also shown in Buckley Pat. 3,342,767 and Fritz Pat. 3,305,520.

What is claimed is:

1. A phosphite having the formula

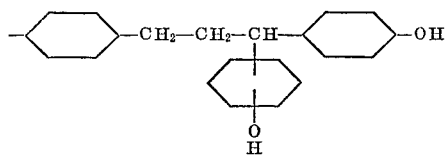

where R is alkyl of 1 to 20 carbon atoms, alkenyl of 3 to 20 carbon atoms, phenyl, alkyl phenyl having 1 to 12 carbon atoms in the alkyl group, haloalkyl having 2 to 3 carbon atoms in the haloalkyl group, halophenyl or

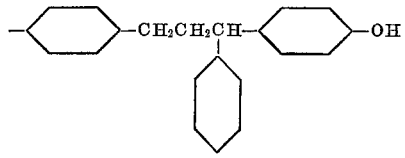

and $n$ is an integer of 1 to 100.

2. A phosphate according to claim 1 wherein R is

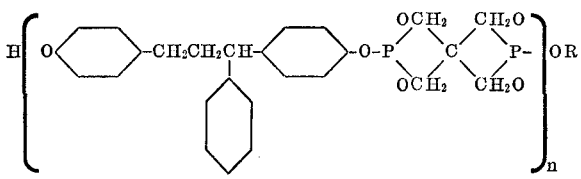

3. A phosphite according to claim 2 where $n$ is 1.
4. A phosphite according to claim 2 where $n$ is an integer between 2 and 8.
5. A phosphite according to claim 1 wherein R is alkyl.
6. A phosphite according to claim 5 where $n$ is an integer between 1 and 8.
7. A phosphite according to claim 6 wherein R is an alkyl of 8 to 18 carbon atoms.
8. A phosphite according to claim 1 wherein R is alkenyl.
9. A phosphite according to claim 8 where R has 18 carbon atoms and $n$ is an integer between 1 and 8.
10. A phosphite according to claim 1 wherein R is aryl.
11. A phosphite according to claim 10 wherein R is phenyl and $n$ is an integer between 1 and 8.
12. A phosphite according to claim 10 wherein R is alkyl phenyl and $n$ is an integer between 1 and 8.

References Cited

Weston Chemical Corp., Product List WCL-4, March 1961.

JOSEPH REBOLD, Primary Examiner

A. H. SUTTO, Assistant Examiner